United States Patent
Seidl et al.

(10) Patent No.: US 12,107,476 B2
(45) Date of Patent: Oct. 1, 2024

(54) ELECTRIC DRIVE SYSTEM WITH AN INVERTER AND TWO COOLING CIRCUITS

(71) Applicant: MAGNA Powertrain GmbH & Co KG, Lannach (AT)

(72) Inventors: Gerhard Seidl, Felixdorf (AT); Rainer Hofkirchner, St. Valentin (AT); Martin Koenigsecker, St. Valentin (AT); Elvis Vrevic, Vienna (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 74 days.

(21) Appl. No.: 17/374,086

(22) Filed: Jul. 13, 2021

(65) Prior Publication Data
US 2022/0037953 A1 Feb. 3, 2022

(30) Foreign Application Priority Data
Aug. 3, 2020 (DE) .......................... 102020209761.5

(51) Int. Cl.
*H02K 5/20* (2006.01)
*H02K 5/18* (2006.01)
*H02K 9/197* (2006.01)

(52) U.S. Cl.
CPC .............. *H02K 5/203* (2021.01); *H02K 5/18* (2013.01); *H02K 9/197* (2013.01)

(58) Field of Classification Search
CPC ........... H02K 5/203; H02K 5/18; H02K 9/197
See application file for complete search history.

(56) References Cited

U.S. PATENT DOCUMENTS

| | | | | |
|---|---|---|---|---|
| 5,611,546 A | * | 3/1997 | Steinberg | ................ H02K 5/10 277/927 |
| 6,222,289 B1 | * | 4/2001 | Adames | ................ H02K 5/203 310/58 |
| 6,323,613 B1 | | 11/2001 | Hara et al. | |
| 10,272,767 B1 | | 4/2019 | Tang et al. | |
| 2004/0150271 A1 | * | 8/2004 | Koga | ................ H02K 7/006 310/64 |
| 2007/0077186 A1 | | 4/2007 | Gil et al. | |
| 2009/0206662 A1 | * | 8/2009 | Kakuda | ................ B60K 6/445 363/141 |

(Continued)

FOREIGN PATENT DOCUMENTS

| | | |
|---|---|---|
| CN | 101647329 A | 2/2010 |
| CN | 101895172 A | 11/2010 |

(Continued)

OTHER PUBLICATIONS

Anton (EP 2774853 A1) English Translation (Year: 2014).*

*Primary Examiner* — Tulsidas C Patel
*Assistant Examiner* — Robert E Mates
(74) *Attorney, Agent, or Firm* — Dickinson Wright PLLC

(57) ABSTRACT

An electric drive system comprising an electric machine, a transmission connected to the electric machine, and an inverter. The electric drive system further comprising an at least two-part housing. The electric drive system having two mutually separate cooling circuits for the inverter and the electric machine, wherein the two cooling circuits are thermally connected via a heat exchanger that is installed, between the inverter and the electric machine, in the housing.

12 Claims, 4 Drawing Sheets

(56) References Cited

U.S. PATENT DOCUMENTS

| | | | | |
|---|---|---|---|---|
| 2014/0239758 A1* | 8/2014 | Nagao | ...................... | H02K 3/00 |
| | | | | 310/71 |
| 2014/0339934 A1* | 11/2014 | Yoshiizumi | .............. | H02K 9/19 |
| | | | | 310/54 |
| 2016/0137044 A1* | 5/2016 | Engblom | ................. | B60G 9/02 |
| | | | | 310/91 |
| 2016/0164378 A1* | 6/2016 | Gauthier | ................. | H02K 1/32 |
| | | | | 310/54 |
| 2019/0312487 A1* | 10/2019 | Okamoto | ................. | B60L 1/02 |
| 2021/0313862 A1* | 10/2021 | Franck | ................... | H02K 9/197 |

FOREIGN PATENT DOCUMENTS

| | | | | | |
|---|---|---|---|---|---|
| CN | 106996707 | A | | 8/2017 | |
| CN | 109936257 | A | | 6/2019 | |
| DE | 102008058962 | A1 | | 5/2010 | |
| DE | 102018209340 | B3 | | 4/2019 | |
| DE | 102018121203 | A1 | | 3/2020 | |
| EP | 2774853 | A1 | * | 9/2014 | ............. B64D 33/08 |
| JP | 2004028508 | A | | 1/2004 | |

\* cited by examiner

ELECTRIC DRIVE SYSTEM WITH AN INVERTER AND TWO COOLING CIRCUITS

CROSS-REFERENCE TO RELATED APPLICATIONS

This application claims priority to German Application No. DE 102020209761.5 filed Aug. 3, 2021. The entire disclosure of the above application is incorporated herein by reference.

FIELD OF THE INVENTION

The invention relates to an electric drive system comprising an electric machine, a transmission connected to the electric machine, an inverter, and an at least two-part housing. The electric drive system having two separate cooling circuits for the inverter and the electric machine.

BACKGROUND OF THE INVENTION

This section provides information related to the present disclosure which is not necessarily prior art.

Electric drives in the automotive sector are increasingly being used under more restricted installation space conditions.

When electrical energy is converted into mechanical energy in electric machines, for example as motors, losses occur in the form of heat. These heat losses must be dissipated to prevent overheating and damage to the electric machine. In addition, dissipating the heat can lead to better efficiency.

The cooling of the drive therefore plays an essential role in achieving adequate power utilisation without exceeding thermal limitations.

Known from DE 10 2014 215 758 A1 is an electric machine having a first circuit through which a first working fluid can flow, and a second circuit through which a second working fluid can flow. The first circuit and the second circuit in this case are hermetically sealed. Furthermore, the first circuit and the second circuit have a common heat-exchanger surface, the heat-exchanger surface being realized in such a manner that thermal energy can be transferred from the first working fluid of the first circuit to the second working fluid of the second circuit, and/or vice versa from the second working fluid to the first working fluid, via the heat-exchanger surface. The direction of transfer can change, for example over time.

The second working fluid of the second circuit, a water-glycol mixture, is used at least temporarily to cool or heat the first working fluid of the first circuit. For this purpose, in the region of a desired or predetermined heat transfer, for example over the existing circumferential surface of the pipes of the second circuit, a second circumferential surface may be arranged at a predetermined distance, in which the first working fluid of the first circuit, namely oil, is guided along the circumferential surface of the second circuit. This region of the circumferential surface of the second cooling circuit thus forms the common heat-exchanger surface of the first and the second circuit. The fact that the circuits are hermetically sealed results in indirect heat transfer by means of the common heat-exchanger surface, such that flows of substances are spatially separated by a heat-permeable wall.

When the electric machine is in operation, a first working fluid flows through the first circuit, and a second working fluid flows through a second circuit. The electric machine is integrated with a transmission, the first circuit being a cooling circuit for the transmission, and the second circuit being a cooling circuit for the rotor and/or for the stator and/or for the converter of the electric machine. In other words, the first working fluid of the first circuit absorbs the thermal losses from the transmission, and transfers these thermal losses to the second working fluid in the second circuit via the heat-exchanger surface, whereas the second working fluid, in addition to the thermal losses from the transmission, also removes the thermal losses of the electric machine, in particular the thermal losses of the motor and/or the converter, and delivers these losses to the environment and/or to a third working fluid.

A cooling device is known from DE 10 2018 121 203 A1. In this case the cooling device, with the first and second cooling channel element, can be used in combination with the motor housing and is integrated in a motor housing. The cooling device serves to act in combination with further components, such as an inverter unit, or inverter cooling.

The cooling device has a first cooling-channel element, which has a first cooling channel, and a second cooling-channel element, which has a second cooling channel, the first and the second cooling-channel element each having a basic arcuate shape about a central axis of the cooling device. The first cooling-channel element and the second cooling-channel element are arranged concentrically with respect to one another, the second cooling-channel element being arranged relative to the first cooling-channel element with respect to the central axis in such a manner that the first and the second cooling channel at least partially overlap in the radial direction along the first and the second cooling-channel element.

DE 10 2018 209 340 B3 discloses a drive unit for a motor vehicle, having an electric machine comprising a stator and a rotor, an inverter connected upstream of the electric machine, and a transmission connected to the rotor for the purpose of torque transmission. The drive unit further comprises a lubricant circuit for the transmission, for lubricating the transmission, and/or for the rotor, for cooling the rotor. The drive unit additionally comprises a first coolant circuit for the first switching unit of the inverter, for cooling the first switching unit. A lubricant-coolant heat exchanger serves to thermally couple the first coolant circuit and the lubricant circuit. The heat exchanger is connected in series downstream of the inverter and is offset from the installation space of the electric machine that comprises the inverter.

U.S. Pat. No. 6,323,613 B1 discloses a drive unit having an electric motor above which an inverter is installed in a structurally integrated manner. A heat exchanger unit is installed between the inverter and the electric machine. This heat exchanger unit consists of the base of the inverter, as well as a separator plate and fin-type structures. The heat exchanger is open downwards, towards the electric machine.

SUMMARY OF THE INVENTION

This section provides a general summary of the disclosure, and is not a comprehensive disclosure of its full scope or all of its features.

It is the object of the invention to construct an improved electric drive unit.

The present invention provides a space-efficient and highly integrated solution for heat dissipation and lubrication of all components of the electric drive unit.

The object is achieved with an electric drive system, comprising an electric machine, a transmission connected to the electric machine, and an inverter, the drive system comprising an at least two-part housing, and the electric drive system having two mutually separate cooling circuits for the inverter and the electric machine, the two cooling circuits being thermally connected via a heat exchanger that is installed, between the inverter and the electric machine, in the housing.

The fact that the heat exchanger is installed between the two main assemblies, the inverter and the electric machine, renders possible an optimal thermal connection to these two assemblies. This optimizes the management of heat dissipation.

For this purpose, it is provided that the heat exchanger has a base and a cover, both of which serve as a heat-exchanger surface between the first and second cooling circuit.

To optimize heat exchange, the heat exchanger has structures for deaerating the second fluid.

For this purpose, fins and knobs are used, which are installed for incident flow by the second fluid.

Structurally, the fins are designed in such a way that the fins extend in a flush manner between the base and the cover of the heat exchanger, while the knobs extend at a distance from the cover of the heat exchanger.

The oil outlets are partially shielded from the incident fluid by a wall, such that the fluid must first overcome the wall.

In this case, oil outlets have a siphon that leads into a narrowed pipe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In this regard:

FIG. 1 shows a schematic representation of the electric drive unit;

FIG. 2 also shows a cooling jacket of the electric drive unit;

DESCRIPTION OF THE INVENTION

Figure 1:
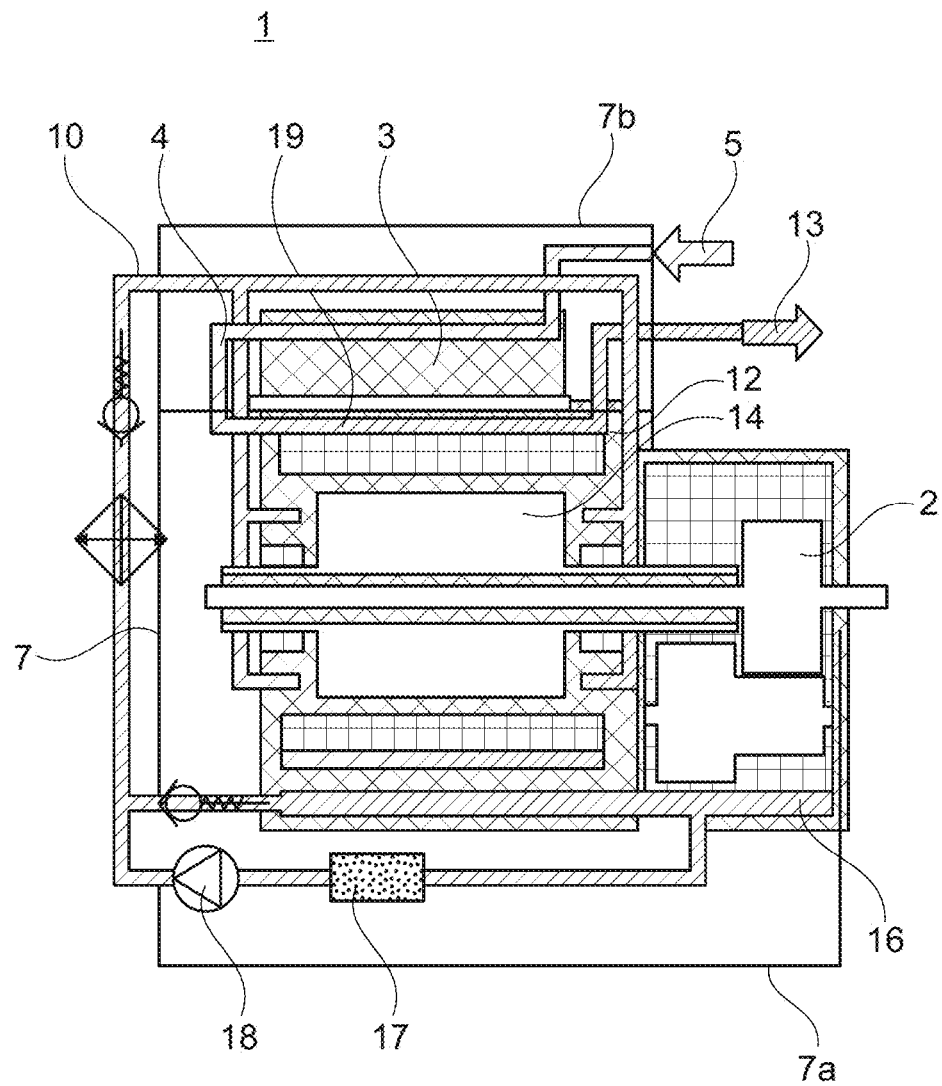

Represented schematically in FIG. 1 is an electric drive system 1 that is arranged in a highly integrated manner in a housing 7. The housing 7 in this case is composed mainly of two housing parts 7a, 7b which are pre-assembled and connected to each other. The housing part 7a of the housing 7 comprises an electric machine 14 and a transmission 2, as well as an oil pump 17. The housing part 7b mainly comprises an inverter 3.

The electric drive system 1 is constructed with a first cooling circuit 4, which is designed for water or glycol/water cooling as a first fluid. The first cooling circuit 4 has an inlet 5 and an outlet 13, and runs in cooling channels in the inverter 3 close to the components of the power electronics of the inverter 3. The first fluid of the first cooling circuit 4 then flows into a cooling jacket 12 of the first cooling circuit, which surrounds a stator 23 of the electric machine 14. The cooling jacket 12 in this case comprises cooling channels 12a, which extend as a helix around the cylindrical jacket around the stator 23.

The electric drive system 1 also comprises a second cooling circuit 10 carrying a second fluid, namely oil. The second cooling circuit 10 comprises an oil sump 16, which is constructed as a common oil sump for the electric machine 14 and the transmission 2, with a split structure also being possible. The electric machine 14 advantageously has a dry sump, while the transmission 2 has a normal wet sump.

From the oil sump, the oil is pumped by an oil pump 18 through a filter 17 into the second cooling circuit 10. The oil serves in this case to cool a rotor 24 of the electric machine 14 by a concept for spraying the second fluid, as well as for lubricating the existing bearing structures in the electric drive system 1.

Figure 2:
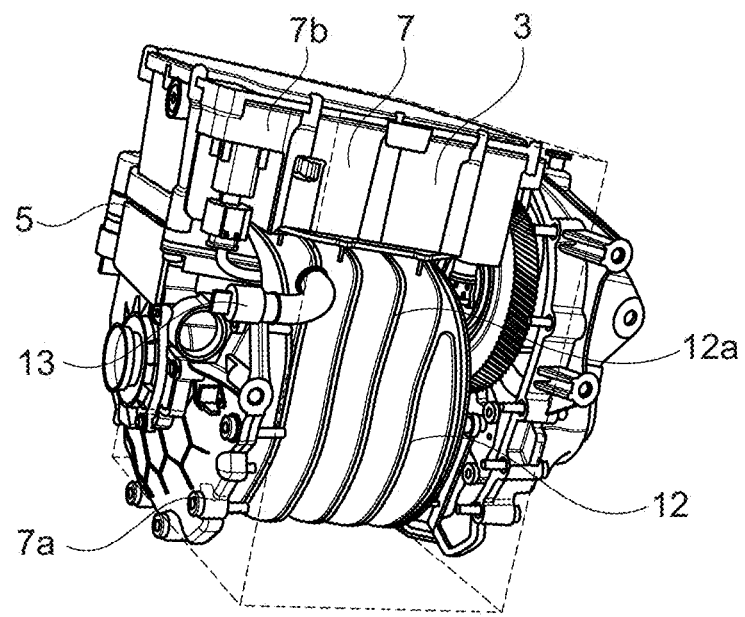

FIG. 2 again shows the cooling jacket 12 of the stator 23 with the cooling channel 12a. FIG. 2 also shows the housing part 7a, which contains the electric machine as the main component, and the housing part 7b with the inverter 3.

Figure 3:
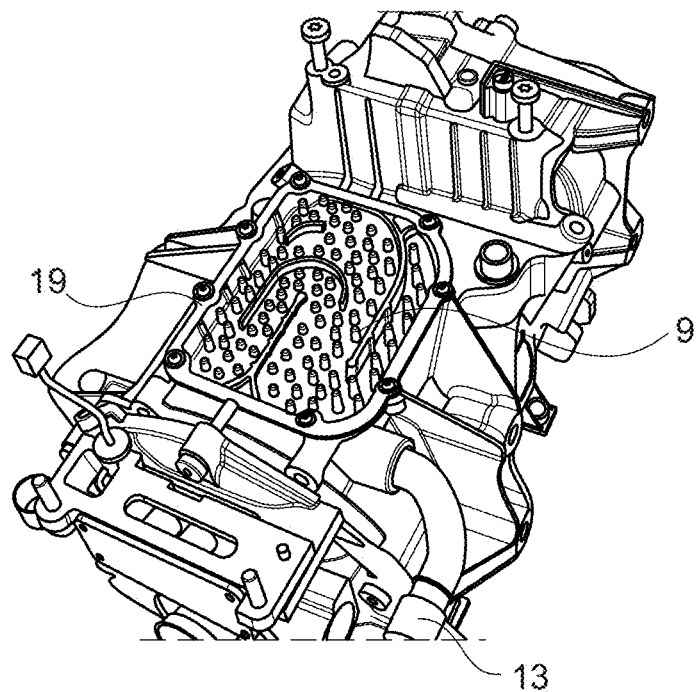
FIG. 3 shows a view of a heat exchanger.
Figure 4:
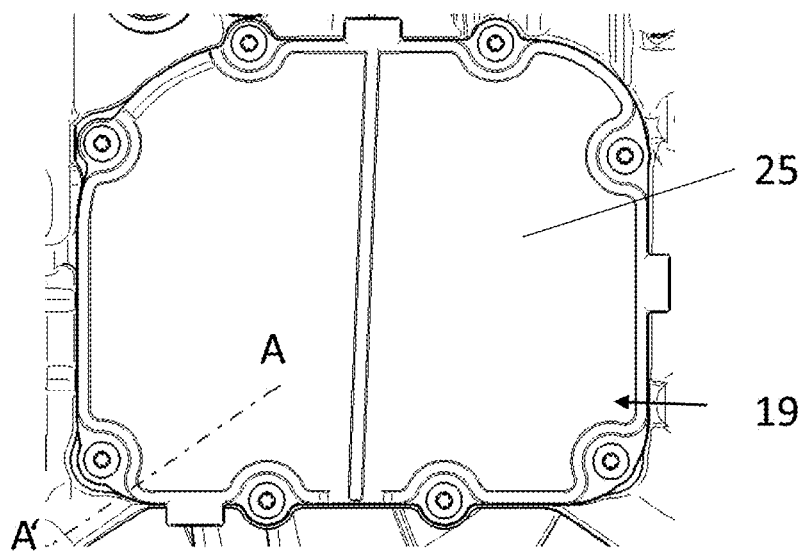
FIG. 4 shows a cover of the heat exchanger.
Figure 5:
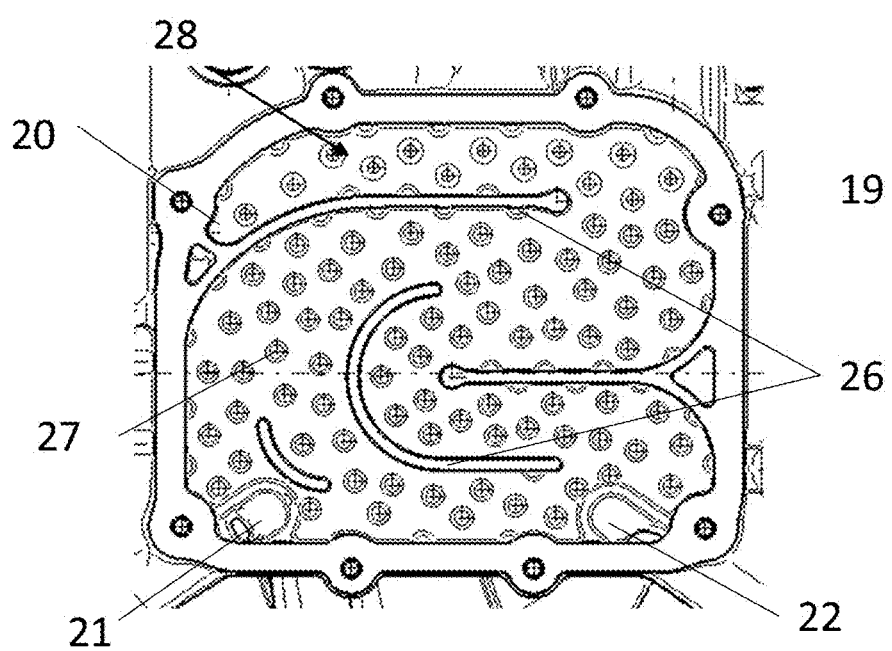
FIG. 5 shows a top view of the inside of the heat exchanger.

FIG. 3 shows a heat exchanger 19, which is installed in the housing part 7a of the housing 7 and in the housing part 7b. The housing part 7a has a base 9 of the heat exchanger 19 on its cylindrical outer skin. This base 9 of the heat exchanger 19 is attached to the structurally highest point of the housing part 7a. The base 9 covers the cooling structure of the cooling jacket 12, such that the temperature of the base 9 is influenced by the temperature in the cooling channels 12a of the first cooling circuit 4.

The base 9 is shaped like a trough, and has both knobs 27 and fins 26 distributed over its surface. The fins 26 in this case extend to such a height that they are closed off by a lid 25. The knobs, on the other hand, do not contact the lid 25. An oil-air mixture drawn in by the oil pump 18 is pumped into the heat exchanger 19 through an oil inlet 20. The inflowing fluid of the second cooling circuit 10 in this case impinges on the wall and a fin 26 and spreads out inside the bottom. The oil outlets 21, 22 are concealed behind fins 26, such that the foaming oil-air mixture already settles on its way to the oil outlets 21, 22 as a result of flowing against the fins 26. The knobs 27 enhance the effect and help with deaerating.

The base 9 of the heat exchanger 19 is closed by the cover 25.

The oil outlets 21, 22 of the heat exchanger 19 are specially designed.

Figure 6:
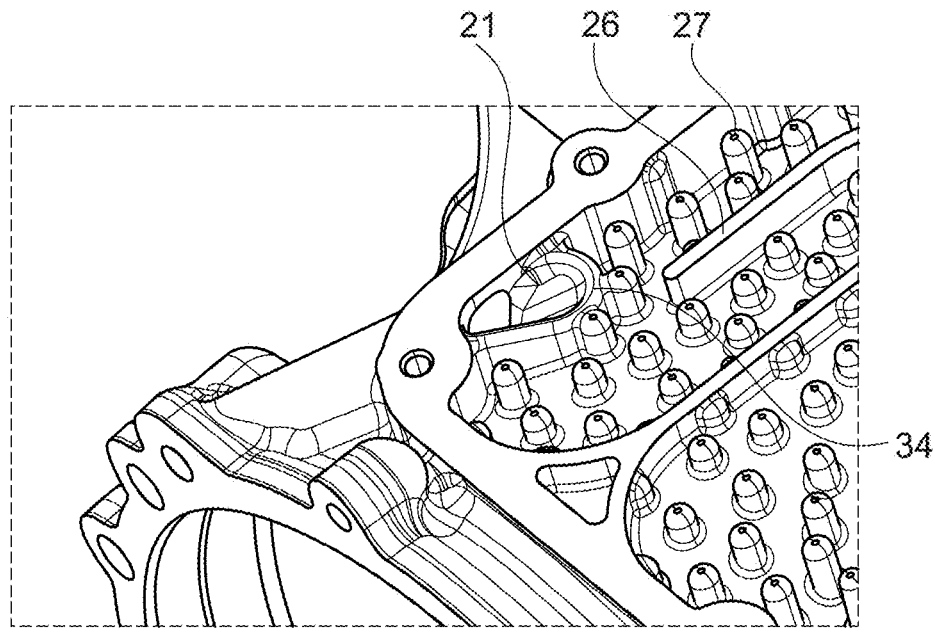
FIG. 6 shows a detail of a drain of the heat exchanger.
Figure 7:
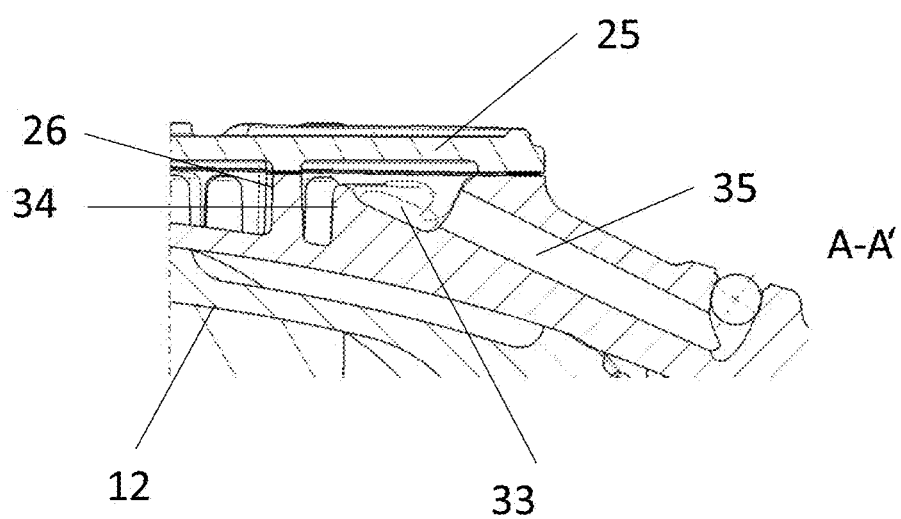
FIG. 7 shows a section through the drain.

As can be seen in FIGS. 6 and 7, the oil drains 21, 22 are designed with a siphon 33. The respective oil drain 21, 22 in this case is provided with a shielding wall 34, which extends approximately to the height of the knobs 27. The siphon 33 is located downstream of the wall 34 and leads into a cooling channel 35. The air in this case is sucked out of the heat exchanger 19 via the siphon 33. For this purpose, the outlet cross-section is reduced in the region of the two oil outlets 21, 22.

The upper side of the cover 25 is connected to the inverter 3, which is cooled by the first cooling circuit 4. Thus, both outer sides of the heat exchanger 19, the base 9 and the cover 25, are each in contact with cooling lines of the first cooling circuit 4, such that heat from the second cooling circuit 10, the oil circuit, in the heat exchanger 19 is transferred from the second cooling circuit 10 to the first cooling circuit 4 of the heat-exchanger surface.

What is claimed:

1. An electric drive system comprising:
an electric machine defining an axis of rotation, a transmission connected to the electric machine, and an inverter,
an at least two-part housing in which the electric machine, transmission, and inverter are disposed, wherein the electric machine is disposed in a first housing part of the housing and the inverter is disposed in a second housing part of the housing, wherein a bottom of the second housing part is attached at a top of the first housing part;
a first cooling circuit for the inverter, the first cooling circuit configured for conveying a first fluid;
a second cooling circuit for the electric machine, the second cooling circuit configured for conveying a second fluid;
wherein the first and second cooling circuits are thermally connected via a common heat exchanger;
wherein the common heat exchanger has a base and a cover that are disposed in the housing radially below the inverter and above the electric machine,
wherein the base and the cover each define a heat-exchanger surface between the first and second cooling circuits,
wherein the first cooling circuit and the second cooling circuit are connected in parallel and fluidically isolated relative to each other;
wherein a heat exchanger portion of the second cooling circuit extends through an axially extending space defined below the cover and above the base;
wherein the heat exchanger portion of the second cooling circuit includes an interior space within the common heat exchanger defined between the base and the cover, such that the second fluid flowing through the second cooling circuit flows through the interior space from an inlet to at least one outlet;
wherein the second fluid exiting the inlet impinges on structure extending between the base and the cover of the common heat exchanger and spreads out along a bottom of the common heat exchanger defined by the base; and
wherein the structure includes fins extending fully between the base and the cover and knobs extending from the base but not in contact with the cover, wherein the at least one outlet of the common heat exchanger includes a shielding wall extending from the base that is not in contact with the cover.

2. The electric drive system of claim 1, wherein the fins and knobs deaerate the second fluid, the fins extending in a flush manner between the base and the cover of the common heat exchanger.

3. The electric drive system of claim 2, wherein the knobs extend upwardly from the base toward the inverter, wherein upper ends of the knobs are spaced from the cover.

4. The electric drive system of claim 1, wherein the first cooling circuit includes a cooling jacket in the first housing part.

5. The electric drive system of claim 4, wherein the cooling jacket includes at least one cooling channel that extends as a helix around a stator of the electric machine.

6. The electric drive system of claim 5, wherein the first housing part includes the base, wherein the base covers the cooling jacket, such that a temperature of the base is influenced by a temperature in the cooling jacket.

7. The electric drive system of claim 6, wherein the second housing part includes the cover, wherein the cover is in contact with cooling lines of the first cooling circuit in the inverter.

8. The electric drive system of claim 7, wherein the base and cover each define outer sides of the common heat exchanger, wherein both outer sides of the common heat exchanger are in contact with the first cooling circuit, such that heat from the second fluid in the common heat exchanger is transferred to the first cooling circuit.

9. The electric drive system of claim 1, wherein the at least one outlet includes a siphon disposed downstream from the shielding wall and leads into a cooling channel.

10. The electric drive system of claim 1, wherein the first cooling circuit includes an inlet and an outlet, wherein the first fluid flowing through the first cooling circuit runs in cooling channels in the inverter, then through a cooling jacket of the first cooling circuit that surrounds a stator of the electronic machine, and then out of the outlet.

11. The electric drive system of claim 1, wherein the common heat exchanger contacts the first cooling circuit on upper and lower outer sides of the common heat exchanger, wherein heat transfers between the second cooling circuit and the first cooling circuit through both the upper and lower outer sides of the common heat exchanger.

12. The electric drive system of claim 11, wherein the second cooling circuit includes a pump, where the pump draws oil from a sump of the transmission and pumps the oil into and through the common heat exchanger.

\* \* \* \* \*